United States Patent
Okamoto et al.

(10) Patent No.: US 10,850,215 B2
(45) Date of Patent: Dec. 1, 2020

(54) MESH FILTER

(71) Applicant: ENPLAS CORPORATION, Saitama (JP)

(72) Inventors: Shinichiro Okamoto, Saitama (JP); Kazuyuki Sakamaki, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 201 days.

(21) Appl. No.: 16/099,940

(22) PCT Filed: May 9, 2017

(86) PCT No.: PCT/JP2017/017538
§ 371 (c)(1),
(2) Date: Nov. 8, 2018

(87) PCT Pub. No.: WO2017/195774
PCT Pub. Date: Nov. 16, 2017

(65) Prior Publication Data
US 2019/0151778 A1     May 23, 2019

(30) Foreign Application Priority Data
May 11, 2016  (JP) .................................. 2016-095395

(51) Int. Cl.
*B01D 29/05* (2006.01)
*B29C 45/27* (2006.01)
(Continued)

(52) U.S. Cl.
CPC ......... *B01D 29/055* (2013.01); *B01D 29/012* (2013.01); *B01D 39/1692* (2013.01);
(Continued)

(58) Field of Classification Search
CPC ........ B01D 46/0005; B01D 2311/2649; B01D 46/0001; B01D 43/00; B01D 29/055; B01D 29/012; B01D 239/1692; B01C 33/42
See application file for complete search history.

(56) References Cited

U.S. PATENT DOCUMENTS

| 5,423,893 A | 6/1995 | Kotaki |
| 2008/0305339 A1 | 12/2008 | Kotaki |

(Continued)

FOREIGN PATENT DOCUMENTS

| JP | 5-44204 | 6/1993 |
| JP | 6-87174 | 3/1994 |

(Continued)

OTHER PUBLICATIONS

International Search Report dated Jul. 4, 2017 in International (PCT) Application No. PCT/JP2017/017538.

*Primary Examiner* — Ana M Fortuna
(74) *Attorney, Agent, or Firm* — Wenderoth, Lind & Ponack, L.L.P.

(57) ABSTRACT

A mesh filter includes a circular plate-shaped mesh portion having a plurality of openings allowing a fluid to pass, a ring-shaped frame body supporting an outer periphery of the mesh portion, and a button-shaped thick portion positioned on an inner peripheral side of the mesh portion. The frame body includes a gate detachment part at one place in a circumferential direction. The mesh portion includes a plurality of inner ribs and outer ribs symmetrical with respect to an imaginary straight line passing through a center of the gate detachment part and bisecting a planar shape of the frame body. The four inner ribs are formed at regular intervals in a peripheral area of a center axis of the thick portion. The outer ribs extend radially inward from an inner (Continued)

peripheral surface of the frame body and are separately formed on both sides of extended lines of the respective inner ribs.

15 Claims, 9 Drawing Sheets (51) Int. Cl.
*B29C 33/42* (2006.01)
*B01D 29/01* (2006.01)
*B01D 39/16* (2006.01)
*F02M 37/34* (2019.01)
*B29K 59/00* (2006.01)
*B29K 77/00* (2006.01)
*B29L 31/14* (2006.01)

(52) U.S. Cl.
CPC .............. *B29C 33/42* (2013.01); *B29C 45/27* (2013.01); *B29K 2059/00* (2013.01); *B29K 2077/00* (2013.01); *B29L 2031/14* (2013.01); *F02M 37/34* (2019.01)

(56) References Cited

U.S. PATENT DOCUMENTS

| 2016/0303495 | A1* | 10/2016 | Suzuki | B29C 45/2628 |
| 2017/0056791 | A1* | 3/2017 | Suzuki | B01D 29/05 |
| 2018/0078881 | A1* | 3/2018 | Suzuki | B29C 33/42 |
| 2018/0264693 | A1* | 9/2018 | Taki | F02M 37/34 |
| 2019/0151778 | A1* | 5/2019 | Okamoto | B29C 33/42 |

FOREIGN PATENT DOCUMENTS

| JP | 6-126784 | 5/1994 |
| JP | 6-320581 | 11/1994 |
| JP | 7-100317 | 4/1995 |
| JP | 2002-86510 | 3/2002 |
| JP | 2007-1232 | 1/2007 |
| JP | 2009-18560 | 1/2009 |
| JP | 2016-203520 | 12/2016 |

* cited by examiner

MESH FILTER

TECHNICAL FIELD

This invention relates to a mesh filter used to filter out, for example, a foreign matter in a fluid and especially relates to the mesh filter integrally molded by injection molding.

BACKGROUND ART

For example, a mesh filter is located in the middle of oil piping such as a fuel supply pipe and a lubricating device coupled to a fuel injection device of an automobile. This mesh filter filters out, for example, a foreign matter in a fluid such as fuel and oil.

First Conventional Example

Figure 8A:
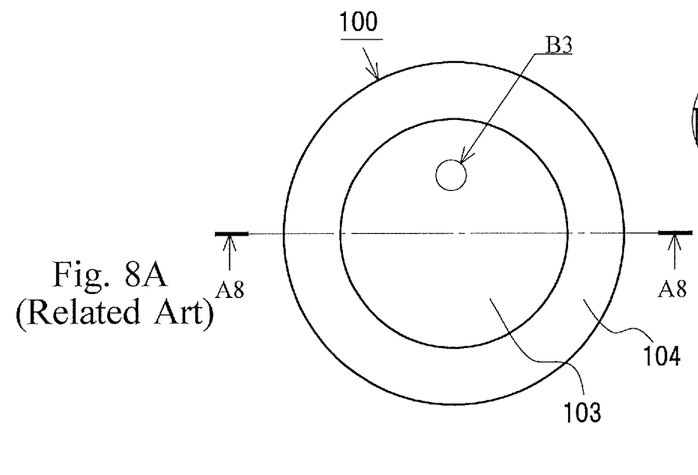
FIG. 8A is a plan view of the mesh filter of the first conventional example.
Figure 8B:
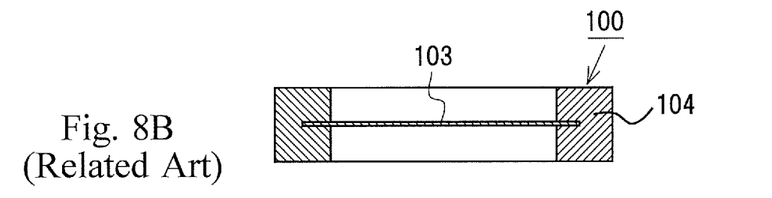
FIG. 8B is a cross-sectional view of the mesh filter of the first conventional example illustrated taken along a line A8-A8 in FIG. 8A.
Figure 8C:
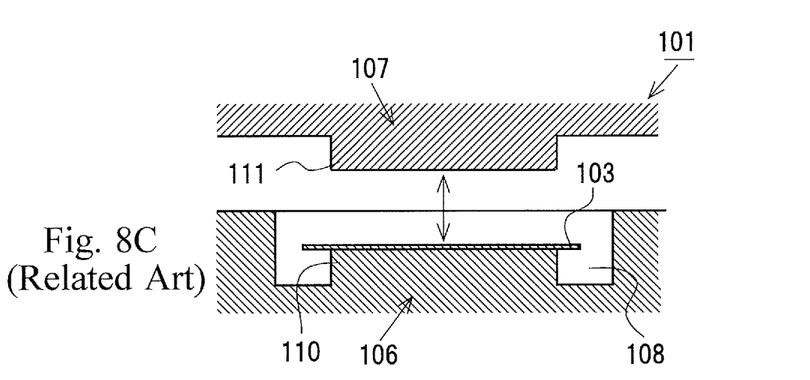
FIG. 8C is a cross-sectional view of a mold to describe a first stage in a molding method of the mesh filter of the first conventional example.
Figure 8D:
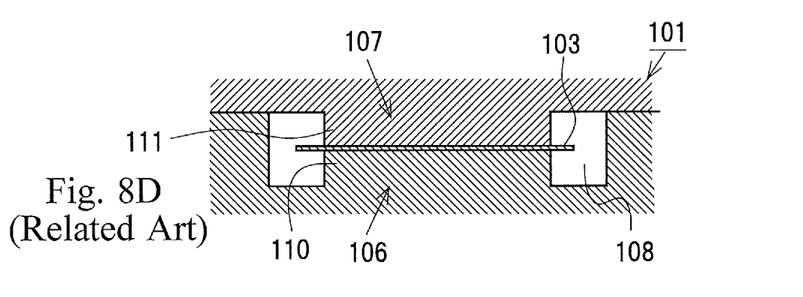
FIG. 8D is a cross-sectional view of the mold to describe a second stage in the molding method of the mesh filter of the first conventional example.
Figure 8E:
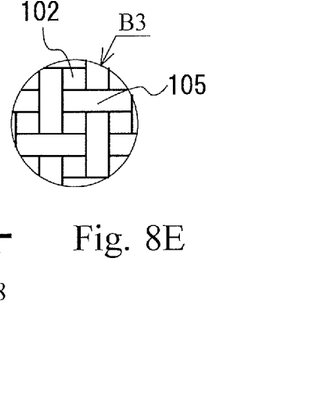
FIG. 8E is an enlarged view of a portion B3 in FIG. 8A.

FIGS. 8A-8D include drawings illustrating a mesh filter 100 of a first conventional example, FIG. 8A is a plan view of the mesh filter 100 of the first conventional example, FIG. 8B is a cross-sectional view of the mesh filter 100 of the first conventional example illustrated taken along a line A8-A8 of FIG. 8A, FIG. 8C is a cross-sectional view of a mold 101 to describe a first stage in a molding method of the mesh filter 100 of the first conventional example, FIG. 8D is a cross-sectional view of the mold 101 to describe a second stage in the molding method of the mesh filter 100 of the first conventional example, and FIG. 8E is an enlarged view of a portion B3 in FIG. 8A.

The mesh filter 100 of the first conventional example illustrated in FIGS. 8A, B, and E includes a mesh member 103 and a tubular frame member 104. The mesh member 103 has a large number of openings 102 through which oil is passable and that can filter out foreign matters (such as metal powders and dirt and dust) with a predetermined size. The tubular frame member 104 made of resin is mounted along the outer peripheral edge of this mesh member 103. The mesh member 103 has a circular-plate shape in plan view, is formed by weaving a fiber 105 made of a material such as a nylon and a polyester in a grid pattern. The quadrangular openings 102 are formed between the fiber 105 woven into the grid.

Such mesh filter 100 of the first conventional example is insert-molded as illustrated in FIGS. 8C and D. First, with a first mold 106 and a second mold 107 opened, the mesh member 103 is located on a base portion 110 in a cavity 108 of the first mold 106 (see FIG. 8E). Next, the second mold 107 is pressed to the first mold 106 (the first mold 106 and the second mold 107 are mold-clamped) such that the mesh member 103 is sandwiched between a pressing portion 111 of the second mold 107 and the base portion 110 of the first mold 106, and the cavity 108 to shape the tubular frame member 104 is formed on a mold mating surface side of the first mold 106 with the second mold 107. After that, a molten resin is injected from a gate (not illustrated) to this cavity 108, thus integrally molding the tubular frame member 104 on the outer peripheral edge of the mesh member 103. Such technique to insert-mold the mesh filter 100 of the first conventional example has been conventionally widely known generally (see Patent Documents 1 and 2).

However, since the mesh filter 100 of the first conventional example illustrated in FIGS. 8A-8D is manufactured by insert molding, compared with the case of entire integral molding by injection molding, manufacturing man-hours are increased by a volume of a necessary process to house the mesh member 103 at a predetermined position in the cavity 108 (see FIG. 8C). With the mesh filter 100 of the first conventional example illustrated in FIGS. 8A-8D, the fiber 105 woven into the grid is likely to be displaced and therefore the shapes of the openings 102 and the areas of the openings 102 (cross-sectional areas of flow passages through which the fluid passes) are likely to vary. This is likely to cause a variation in filter performance (performance that can remove foreign matters with a predetermined grain diameter or more).

SECOND CONVENTIONAL EXAMPLE

Figure 9:
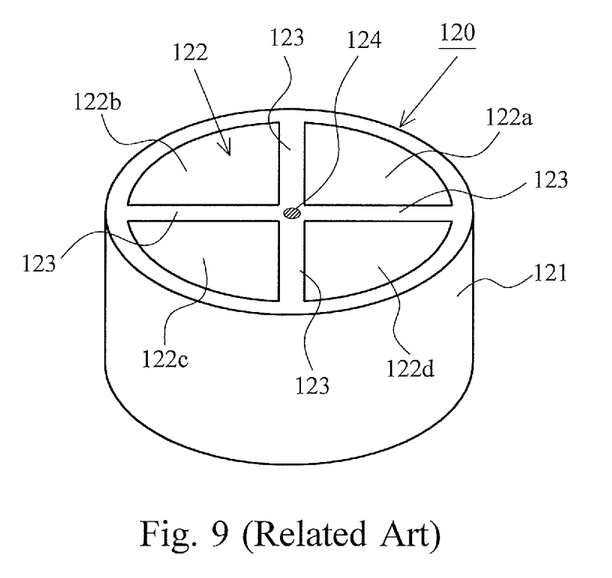
FIG. 9 is a drawing illustrating a mesh filter according to a second conventional example.

FIG. 9 is a drawing illustrating a mesh filter 120 according to the second conventional example. The mesh filter 120 illustrated in FIG. 9 includes a cylindrical outer pipe (framing member) 121, a mesh portion 122, which is formed so as to stretch across an inner peripheral surface on one end side of this outer pipe 121, and four radial ribs 123 to reinforce this mesh portion 122. The mesh portion 122 is divided into four (divided into first to fourth mesh parts 122$a$ to 122$d$) in an approximately circular sector shape with the four radial ribs 123, which extend from the center part to the outer pipe 121 at regular intervals. The mesh filter 120 according to the second conventional example is entirely integrally molded by injection molding and can improve the above-described drawbacks of the insert molded mesh filter 100 of the first conventional example.

Patent Document 1: Japanese Unexamined Utility Model Application Publication No. 5-44204

Patent Document 2: Japanese Unexamined Patent Application Publication No. 2007-1232

Patent Document 3: Japanese Unexamined Patent Application Publication No. 6-320581

DISCLOSURE OF THE INVENTION

Problems to be Solved by the Invention

However, a gate 124 for injection molding is positioned (opened) at the center part (the intersecting part of the four radial ribs 123) on the one end surface of the outer pipe 121 of the mesh filter 120 according to the second conventional example; therefore, this causes the following problem. At the injection molding, after molten resin flows into a cavity portion that shapes the outer pipe 121 from a cavity portion that shapes the radial ribs 123, the molten resins in the cavity portion that shapes the radial ribs 123 and in the cavity portion that shapes the outer pipe 121 are flown into a cavity portion that shapes the first to the fourth mesh parts 122$a$ to 122$d$. Therefore, final filled portions of the molten resins are positioned at the respective first to fourth mesh parts 122$a$ to 122$d$, thus degrading strengths of the first to the fourth mesh parts 122$a$ to 122$d$.

Therefore, an object of the present invention is to provide a mesh filter having a shape that can avoid a mesh portion to be a final filled portion and the shape that can reinforce the mesh portion.

Solutions to the Problems

The present invention relates to a mesh filter 1 in which a mesh portion 2, a ring-shaped frame body 4, and a thick portion 5 are integrally injection-molded. The mesh portion 2 has a plurality of openings 3 through which a fluid is passable. The ring-shaped frame body 4 supports an outer peripheral side of the mesh portion 2. The thick portion 5 is positioned on an inner peripheral side of the mesh portion 2.

In the present invention, the frame body 4 includes a gate detachment part 6 for injection molding at one place in a circumferential direction. The mesh portion 2 is integrally formed with an outer rib 13. The outer rib 13 extends from the outer peripheral side to the inner peripheral side at a position away from the gate detachment part 6. The outer rib 13 is symmetrical with respect to an imaginary straight line 11. The imaginary straight line 11 passes through a center of the gate detachment part 6 and bisects a planar shape of the frame body 4. The thick portion 5 is formed so as to be positioned at a final filled portion of a molten resin flowing from the frame body 4 toward the inner peripheral side of the mesh portion 2 at injection molding. The outer rib 13 reinforces the mesh portion 2. The outer rib 13 accelerates the flow of the molten resin at the injection molding at the position away from the gate detachment part 6.

Effects of the Invention

With a mesh filter according to the present invention, a flow of molten resin at injection molding at a position away from a gate detachment part is accelerated by an outer rib part. Accordingly, a final filled portion of the molten resin at injection molding can be a thick portion and therefore a mesh portion does not become the final filled portion. This avoids causing a defect shape of the mesh portion caused by short shot (does not adversely affect the injection molding) and reinforces the mesh portion by the outer rib.

BRIEF DESCRIPTION OF THE DRAWINGS

FIGS. 1A-1D include drawings illustrating a mesh filter according to a first embodiment of the present invention.

FIGS. 2A-2C include drawings illustrating the mesh filter according to the first embodiment of the present invention.

FIGS. 3A-3D include drawings illustrating a simplified injection molding mold of the mesh filter according to the first embodiment of the present invention.

FIGS. 4A-4D include drawings illustrating the mesh filter according to a second embodiment of the present invention.

FIGS. 5A-5D include drawings illustrating the mesh filter according to a third embodiment of the present invention.

FIGS. 6A-6D include drawings illustrating the mesh filter according to a fourth embodiment of the present invention.

FIGS. 7A-7D include includes drawings illustrating the mesh filter according to a fifth embodiment of the present invention.

FIGS. 8A-8D include drawings illustrating a mesh filter of a first conventional example.

DESCRIPTION OF PREFERRED EMBODIMENTS

The following describes embodiments of the present invention in detail with reference to the drawings.

FIRST EMBODIMENT

Figure 1A:
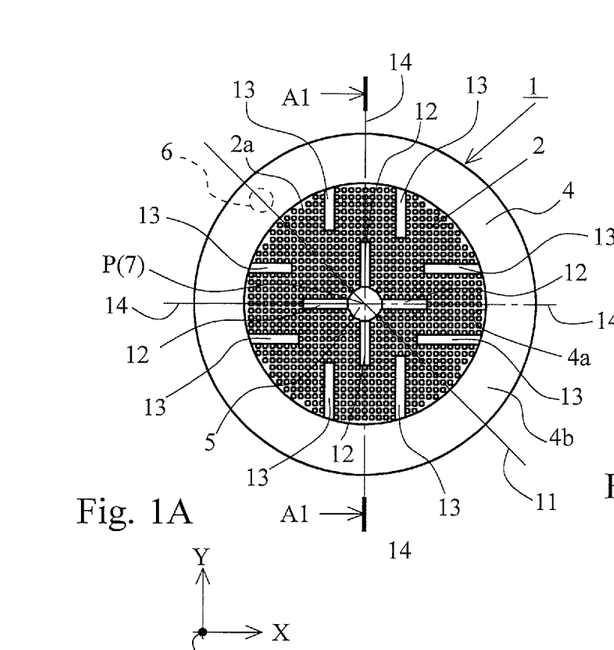
FIG. 1A is a plan view of the mesh filter.
Figure 1B:
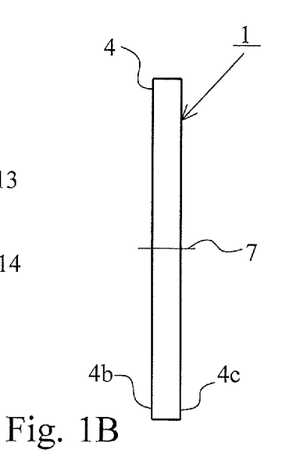
FIG. 1B is a side view of the mesh filter.
Figure 1C:
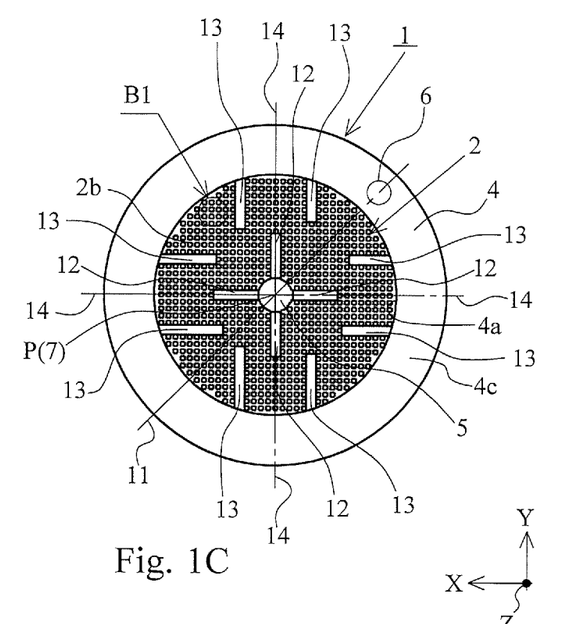
FIG. 1C is a back view of the mesh filter.
Figure 1D:
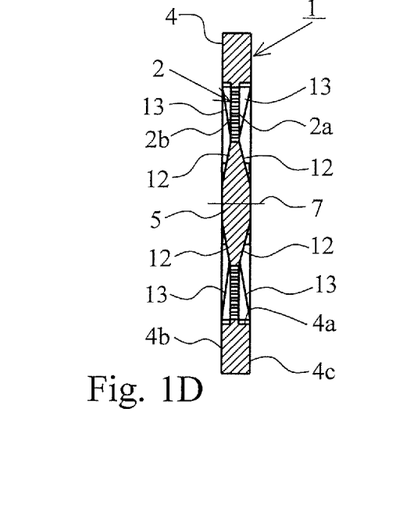
FIG. 1D is a cross-sectional view of the mesh filter illustrated taken along a line A1-A1 of FIG. 1A.
Figure 2A:
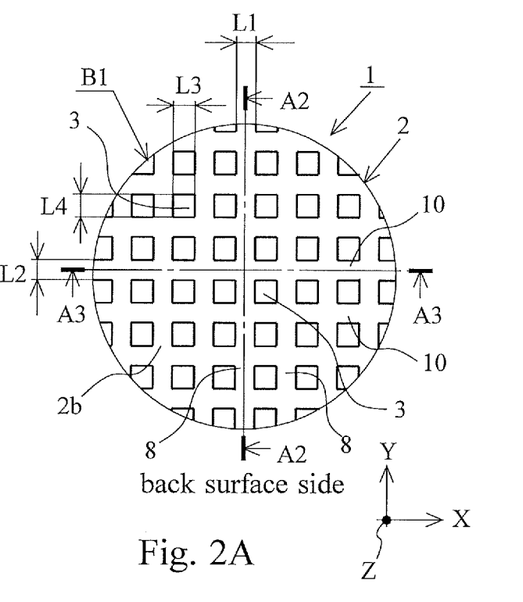
FIG. 2A is an enlarged view of a part (portion B1) of a mesh portion illustrated in FIG. 1C.
Figure 2B:
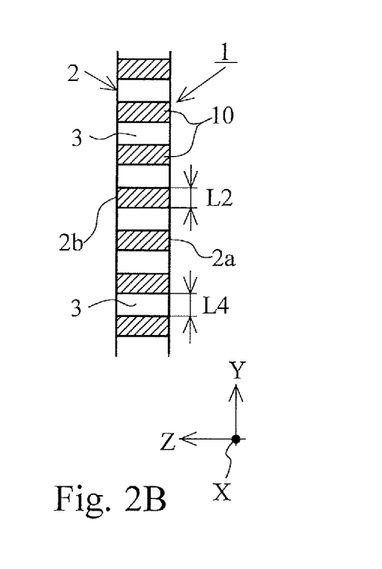
FIG. 2B is a cross-sectional view of the mesh portion illustrated taken along a line A2-A2 of FIG. 2A.
Figure 2C:
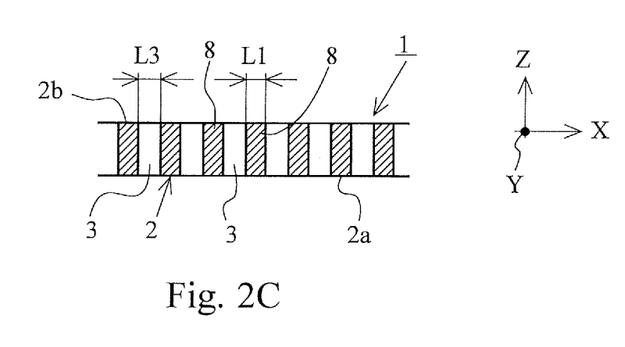
FIG. 2C is a cross-sectional view of the mesh portion illustrated taken along a line A3-A3 of FIG. 2A.

FIGS. 1A-1D and FIGS. 2A-2C are drawings illustrating a mesh filter 1 according to the first embodiment of the present invention, FIG. 1A is a plan view of the mesh filter 1, FIG. 1B is a side view of the mesh filter 1, FIG. 1C is a back view of the mesh filter 1, and FIG. 1D is a cross-sectional view of the mesh filter 1 illustrated taken along a line A1-A1 of FIG. 1A. FIG. 2A is an enlarged view of a part (portion B1) of a mesh portion 2 illustrated in FIG. 1C, FIG. 2B is a cross-sectional view of the mesh portion 2 illustrated taken along a line A2-A2 of FIG. 2A, and FIG. 2C is a cross-sectional view of the mesh portion 2 illustrated taken along a line A3-A3 of FIG. 2A.

As illustrated in FIGS. 1A-1D and FIGS. 2A-2C, the mesh filter 1 includes the circular-plate-shaped mesh portion 2 having a plurality of openings 3 through which a fluid is passable, a circular-ring-shaped frame body 4 that supports the outer peripheral side of this mesh portion 2, and a button-shaped thick portion 5 positioned on the inner peripheral side of the mesh portion 2.

The frame body 4 has a circular ring shape in plan view and is formed to have an identical plate thickness. This frame body 4 includes a gate detachment part 6 for injection molding positioned at one place in a circumferential direction.

The mesh portion 2 is formed to stretch across an inner peripheral surface 4a side of the frame body 4 in a circular plate shape, is formed thinner than the plate thickness of the frame body 4, and includes the button-shaped thick portion 5 at the geometric center (the geometric center of the frame body 4) P of the mesh filter 1. The button-shaped thick portion 5 has a circular protrusion shape in plan view, is formed to have the thickness identical to the plate thickness of the frame body 4, and has a front surface identical to an imaginary plane of the frame body 4 including a front surface 4b and has a back surface identical to an imaginary plane of the frame body 4 including a back surface 4c.

Defining an imaginary plane perpendicular to a center axis 7, which is positioned at the center of the mesh filter 1, as an X-Y plane, the mesh portion 2 is formed along this X-Y plane. A plurality of quadrangular openings 3 are formed on parts other than a coupling portion of the frame body 4 with the thick portion 5 in the mesh portion 2 by a plurality of vertical crosspieces 8, which are formed perpendicular to the X-axis and parallel to the Y-axis at regular intervals, and a plurality of horizontal crosspieces 10, which are formed perpendicular to these vertical crosspieces 8 and parallel to the X-axis at regular intervals. The vertical crosspiece 8 has a crosspiece width L1 with a dimension identical to a crosspiece width L2 of the horizontal crosspiece 10. A width dimension L3 between the adjacent vertical crosspieces 8, 8 has a dimension identical to a width dimension L4 between the adjacent horizontal crosspieces 10, 10. Accordingly, the plurality of openings 3 have identical regular tetragon shapes (the regular tetragons having an equal opening area) in plan view.

The mesh portion 2 includes a plurality of ribs (12, 13) on both front and back surfaces 2a, 2b. The plurality of ribs (12, 13) are integrally formed so as to be symmetrical with respect to an imaginary straight line 11 passing through the center of the gate detachment part 6 and bisecting the planar shape of the frame body 4. The plurality of ribs (12, 13) include the inner ribs 12 and the outer ribs 13. The four inner ribs 12 are formed at regular intervals along the outer peripheral surface of the thick portion 5 (the peripheral area of the center axis 7 of the mesh filter 1), and the eight outer ribs 13 are formed along the inner peripheral surface 4a of the frame body 4 on each of both front and back surfaces 2a, 2b.

The four inner ribs 12 are radially formed at the identical lengths outward (toward the frame body 4) in the radial direction from the outer periphery of the thick portion 5 and extend from the outer peripheral surface of the thick portion 5 to approximately intermediate positions between the thick portion 5 and the frame body 4. The inner ribs 12 are each formed such that a height dimension from the front surface 2a (or the back surface 2b) of the mesh portion 2 gradually decreases as the inner rib 12 is away from the outer periphery of the thick portion 5 (as the inner rib 12 heads for radially outward). The inner ribs 12 are each positioned displaced by 45° with respect to the imaginary straight line 11 bisecting the planar shape of the frame body 4 and formed to be symmetrical with respect to the imaginary straight line 11.

The outer ribs 13 are separately formed by a pair opposed to both sides of an extended line 14 of the respective inner ribs 12 and formed to be parallel to the inner ribs 12. The lengths of the eight outer ribs 13 are changed according to distances of the outer ribs 13 from the gate detachment part 6 such that the outer ribs 13 positioned far from the gate detachment part 6 become longer than the outer ribs 13 close to the gate detachment part 6. That is, the lengths of the outer ribs 13 lengthen as the outer ribs 13 are far from the gate detachment part 6. The outer ribs 13 are each formed such that a height dimension from the front surface 2a (or the back surface 2b) of the mesh portion 2 gradually decreases as the outer rib 13 is away from the inner peripheral surface 4a of the frame body 4 (as the outer rib 13 heads for radially inward).

The inner ribs 12 and the outer ribs 13 adjust a flow of molten resin such that a final filled portion of the molten resin that flows through a cavity portion with which the mesh portion 2 is shaped becomes the thick portion 5 at injection molding of the mesh filter 1. That is, in the cavity portion shaping the mesh portion 2, a filling rate of the molten resin (a filling rate of the molten resin heading radially inward from the frame body 4) slows as the cavity portion is away from the gate for injection molding (the gate detachment part 6 illustrated in FIG. 1C). Therefore, in the mesh filter 1 of the embodiment, the inner ribs 12 and the outer ribs 13 are formed at the mesh portion 2 and the lengths of the outer ribs 13 are lengthened as the outer ribs 13 are far from the gate detachment part 6. Accordingly, the embodiment devises such that the flow of the molten resin is accelerated at the cavity portions shaping the inner ribs 12 and the outer ribs 13 and the thick portion 5 becomes the final filled portion of the molten resin at injection molding. With the mesh filter 1 according to the embodiment, the final filled portion of the molten resin becomes the thick portion 5 at injection molding; therefore, the thick portion 5 is usable as a gas purge portion at injection molding, thereby ensuring simplifying the structure of the injection molding mold. Additionally, the mesh portion 2 is reinforced by the plurality of outer ribs 13, which extend radially inward from the frame body 4, and the plurality of inner ribs 12, which extend radially outward from the thick portion 5.

The mesh filter 1 having the above-described structure is entirely injection-molded integrally with resin (such as polyacetal (POM) and polyamide) (PA)).

While the mesh portion 2 is formed to be positioned slightly displaced from the center of the frame body 4 in a plate thickness direction (Z-axis direction) along the −Z-axis direction, the mesh portion 2 may be formed to be positioned at the center of the frame body 4 in the plate thickness direction according to a shape of a mounting part of the mesh filter 1 or similar specification, or may be formed to be positioned displaced from the center of the frame body 4 in the plate thickness direction along the +Z-axis direction.

Figure 3A:
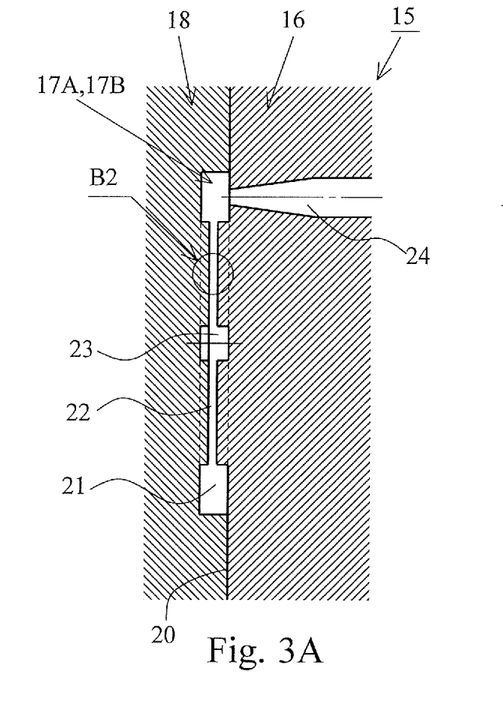
FIG. 3A is a cross-sectional view of the injection molding mold.
Figure 3B:
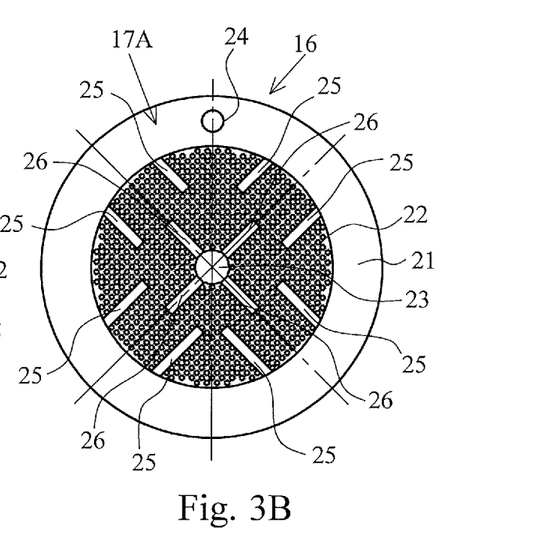
FIG. 3B is a plan view illustrating a cavity of a fixed side mold at mold opening of the injection molding mold.
Figure 3C:
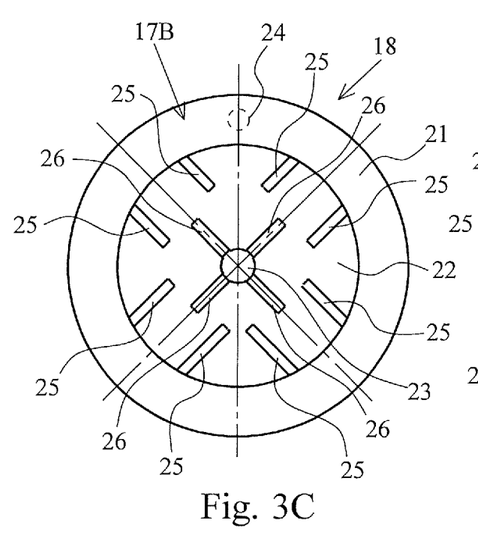
FIG. 3C is a plan view illustrating a cavity of a movable side mold at mold opening of the injection molding mold.
Figure 3D:
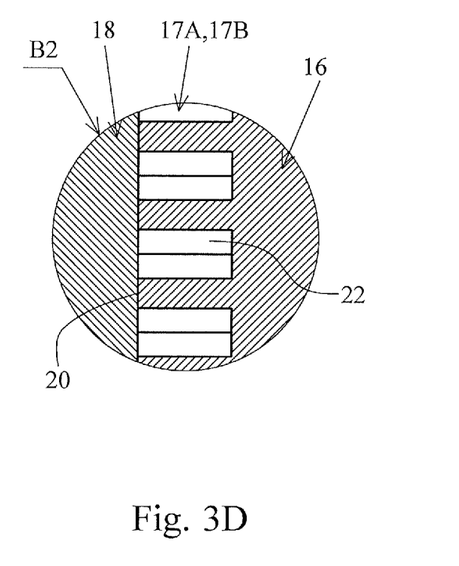
FIG. 3D is a drawing illustrating an enlarged portion B2 of FIG. 3A.

FIGS. 3A-3D include drawings illustrating a simplified injection molding mold 15 of the mesh filter 1 according to the embodiment, FIG. 3A is a cross-sectional view of the injection molding mold 15, FIG. 3B is a plan view illustrating a cavity 17A of a fixed side mold 16 at mold opening of the injection molding mold 15, FIG. 3C is a plan view illustrating a cavity 17B of a movable side mold 18 at mold opening of the injection molding mold 16, and FIG. 3D is a drawing illustrating an enlarged portion B2 of FIG. 3A.

As illustrated in FIGS. 3A-3D, the injection molding mold 15 includes cavities 17A, 17B for injection molding of the mesh filter 1 on a mold mating surface 20 side of the fixed side mold 16 with the movable side mold 18. The cavities 17A, 17B include first cavity portions 21 to shape the frame body 4, second cavity portions 22 to shape the mesh portion 2, and third cavity portions 23 to shape the thick portion 5. Among these cavity portions, a gate 24 for injection molding is open at the first cavity portion 21 of the fixed side mold 16 at one place in a circumferential direction. At the second cavity portions 22 of the fixed side mold 16 and the movable side mold 18, a plurality of outer rib formation cavity parts 25 to shape the plurality of outer ribs 13 and a plurality of inner rib formation cavity parts 26 to shape the plurality of inner ribs 12 are formed. The plurality of outer rib formation cavity parts 25 positioned far from the gate 24 for injection molding are longer than the plurality of outer rib formation cavity parts 25 positioned close to the gate 24 for injection molding.

With such injection molding mold 15, when the molten resin is injected from the gate 24 into the first cavity portion 21, the molten resin flows into the first cavity portion 21 bisected clockwise and anticlockwise, and then the molten resin flows from the first cavity portion 21 into the second cavity portion 22. The filling rate of the molten resin from this first cavity portion 21 into the second cavity portion 22 slows as the second cavity portion 22 is far from the gate 24. However, with the injection molding mold 15 of the mesh filter 1 according to the embodiment, the outer rib formation cavity parts 25 and the inner rib formation cavity parts 26 are formed on the second cavity portions 22, and further the outer rib formation cavity parts 25 are formed to lengthen as the outer rib formation cavity parts 25 are far from the gate 24. Therefore, a degree of acceleration of filling of the molten resin in the second cavity portion 22 increases as the second cavity portion 22 is far from the gate 24, the filling rate of the molten resin flowing through the second cavity portion 22 is adjusted according to the position from the gate 24, and the third cavity portion 23 becomes the final filled portion of the molten resin flowing through the second cavity portion 22.

As described above, with the mesh filter 1 according to the embodiment, the flow of the molten resin at injection molding at the position away from the gate detachment part 6 is accelerated by the plurality of outer ribs 13 and the plurality of inner ribs 12. Accordingly, the final filled portion of the molten resin at injection molding becomes the thick portion 5 and therefore the mesh portion 2 does not become the final filled portion. This avoids causing a defect shape of the mesh portion 2 caused by short shot (does not adversely affect the injection molding) and reinforces the mesh portion 2 by the outer ribs 13 and the inner ribs 12.

SECOND EMBODIMENT

Figure 4A:
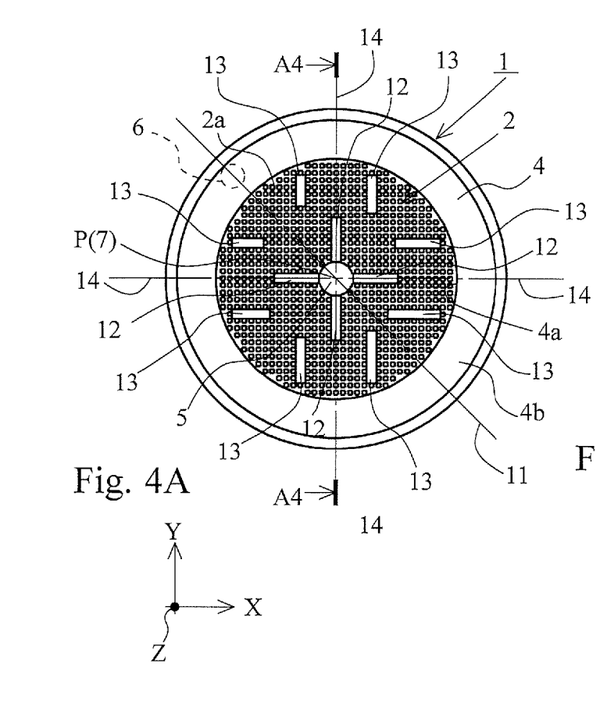
FIG. 4A is a plan view of the mesh filter.
Figure 4B:
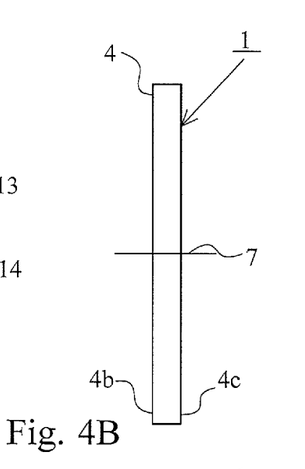
FIG. 4B is a side view of the mesh filter.
Figure 4C:
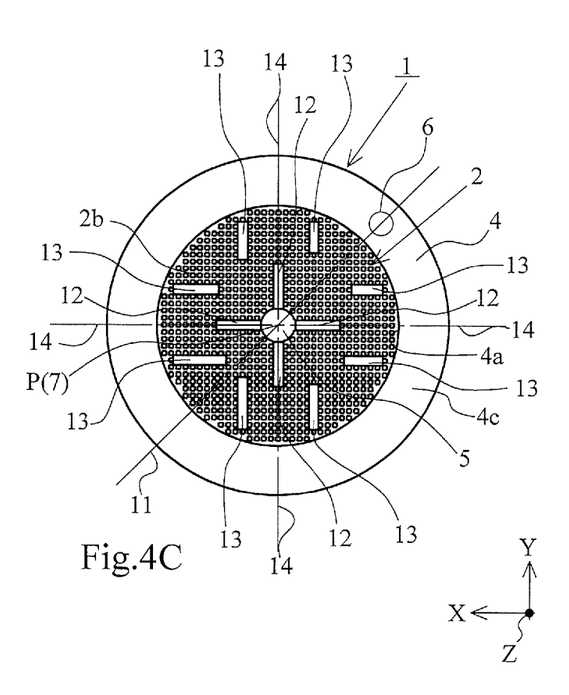
FIG. 4C is a back view of the mesh filter.
Figure 4D:
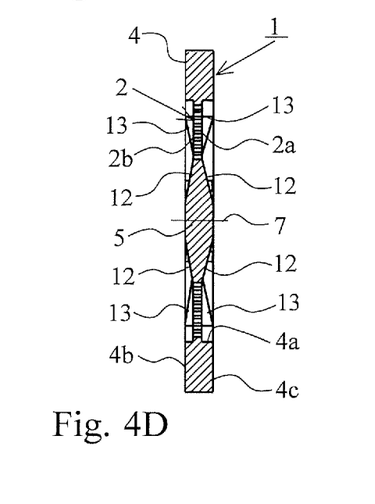
FIG. 4D is a cross-sectional view of the mesh filter illustrated taken along a line A4-A4 of FIG. 4A.

FIGS. 4A-4D include drawings illustrating the mesh filter 1 according to the second embodiment of the present invention, FIG. 4A is a plan view of the mesh filter 1, FIG. 4B is a side view of the mesh filter 1, FIG. 4C is a back view of the mesh filter 1, and FIG. 4D is a cross-sectional view of the mesh filter 1 illustrated taken along a line A4-A4 of FIG. 4A.

Except that the outer ribs 13 are formed to be positioned away from the inner peripheral surface 4a of the frame body 4, the mesh filter 1 according to the embodiment has the other configuration identical to that of the mesh filter 1 according to the first embodiment. Therefore, identical reference numerals are used for components of the mesh filter 1 according to the embodiment corresponding to the components of the mesh filter 1 according to the first embodiment, and the following omits descriptions overlapped with those of the mesh filter 1 according to the first embodiment.

With the mesh filter 1 according to the embodiment, the flow of the molten resin flowing from the frame body 4 side to the mesh portion 2 side is accelerated from the middle (a part close to the outer periphery of the mesh portion 2 and a part where the outer rib 13 is formed) of the mesh portion 2 in the radial direction. The mesh filter 1 according to the embodiment can obtain the effects similar to those of the mesh filter 1 according to the first embodiment.

THIRD EMBODIMENT

Figure 5A:
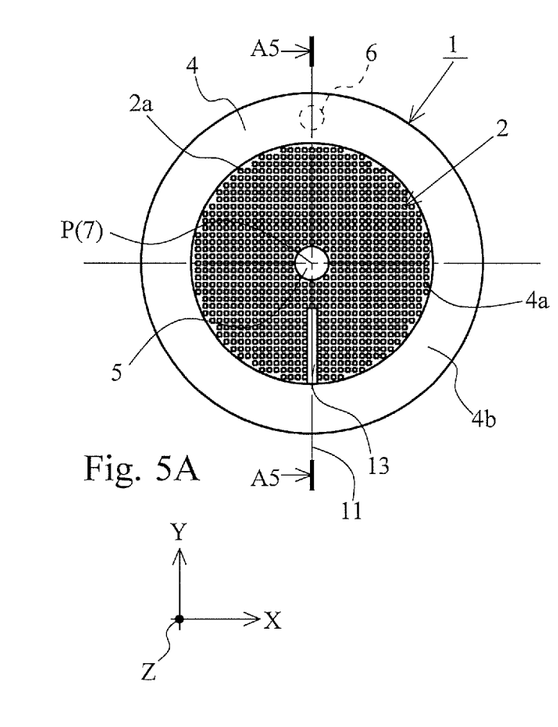
FIG. 5A is a plan view of the mesh filter.
Figures 5B, 5C, 5D:
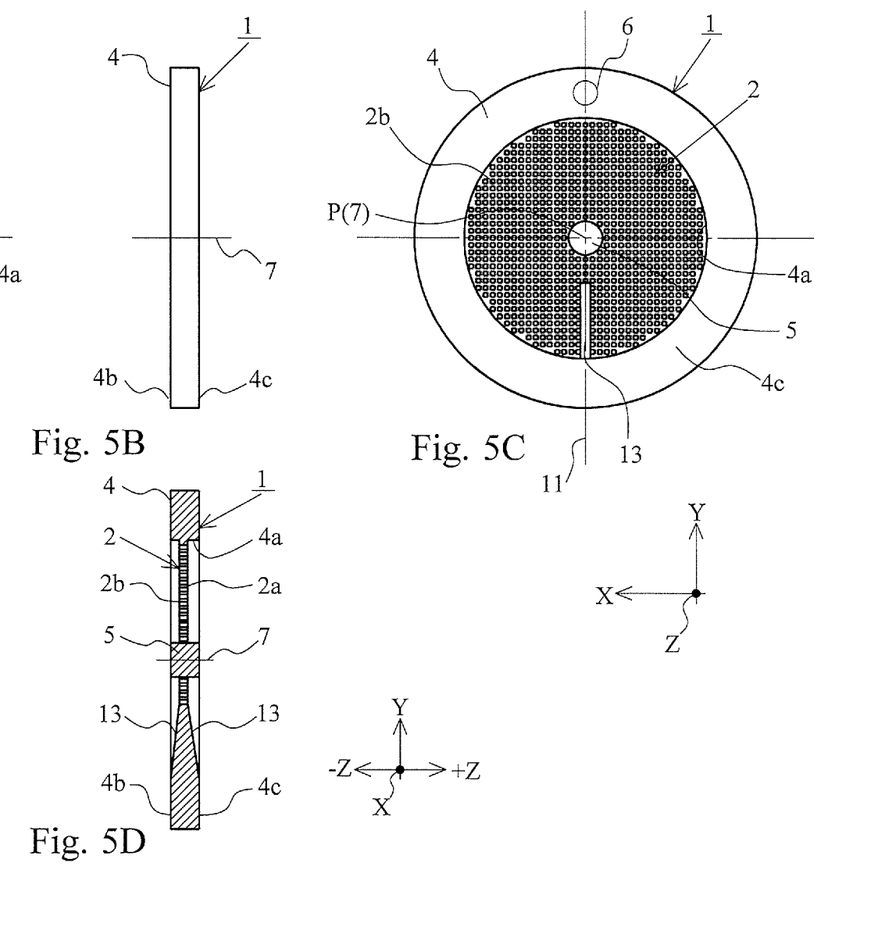
FIG. 5B is a side view of the mesh filter.
FIG. 5C is a back view of the mesh filter.
FIG. 5D is a cross-sectional view of the mesh filter illustrated taken along a line A5-A5 of FIG. 5A.

FIGS. 5A-5D include drawings illustrating the mesh filter 1 according to the third embodiment of the present invention, FIG. 5A is a plan view of the mesh filter 1, FIG. 5B is a side view of the mesh filter 1, FIG. 5C is a back view of the mesh filter 1, and FIG. 5D is a cross-sectional view of the mesh filter 1 illustrated taken along a line A5-A5 of FIG. 5A.

The mesh filter 1 according to the embodiment includes the one outer rib 13 at each of both front and back surfaces 2a, 2b of the mesh portion 1. This outer rib 13 is formed at a position on the imaginary straight line 11, which passes through the center of the gate detachment part 6 and bisects the planar shape of the frame body 4, and is formed at a position on the imaginary straight line 11 rotated by 180° from the gate detachment part 6 with respect to the geometric center P (the center of the thick portion 5) of the frame body 4. This outer rib 13 extends from the inner peripheral surface 4a of the frame body 4 to a near side of the thick portion 5 along the imaginary straight line 11 and is formed so as to gradually decrease in height from the front surface 2a (or the back surface 2b) of the mesh portion 2 as the outer rib 13 is away from the frame body 4 radially inward. The mesh filter 1 with such configuration is formed into a linearly symmetrical shape with respect to the imaginary straight line 11.

The mesh filter 1 according to the embodiment is effectively applicable to the mesh filter 1 having a size smaller than that of the mesh filter 1 according to the first embodiment (the total area of the openings 3 on the mesh portion 2 is configured to be larger than that of the openings 3 in the case where the configuration of the mesh filter 1 according to the first embodiment is applied), thus ensuring obtaining the effects similar to those of the mesh filter 1 according to the first embodiment. Identical reference numerals are used for components of the mesh filter 1 according to the embodiment corresponding to the components of the mesh filter 1 according to the first embodiment, and the following omits descriptions overlapped with those of the mesh filter 1 according to the first embodiment.

FOURTH EMBODIMENT

Figure 6A:
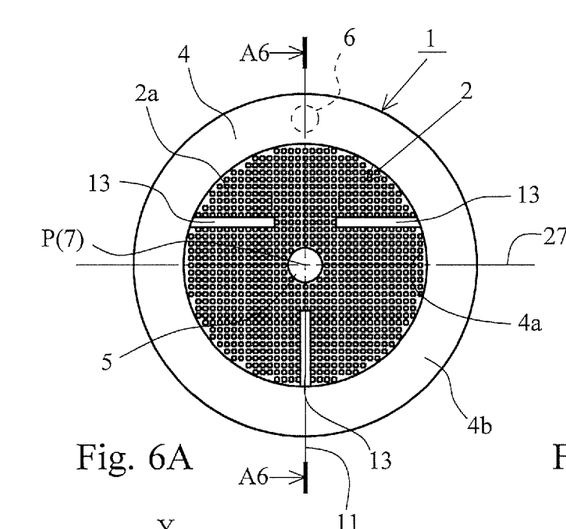
FIG. 6A is a plan view of the mesh filter.
Figure 6B:
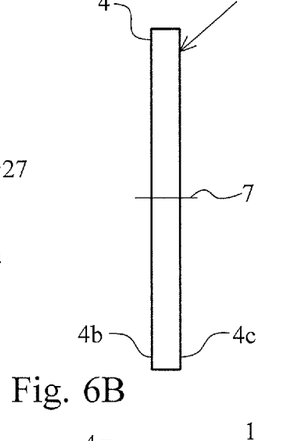
FIG. 6B is a side view of the mesh filter.
Figure 6C:
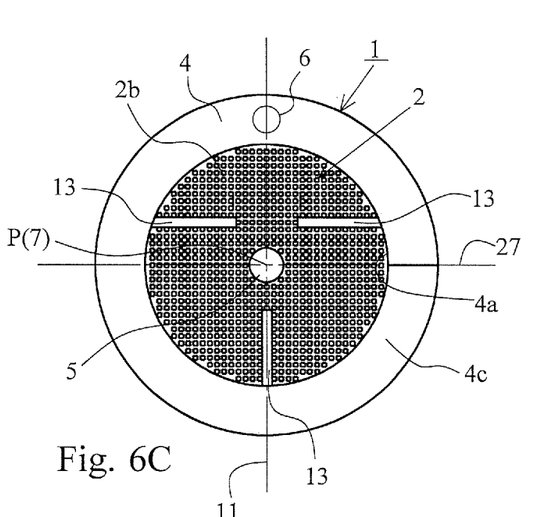
FIG. 6C is a back view of the mesh filter.
Figure 6D:
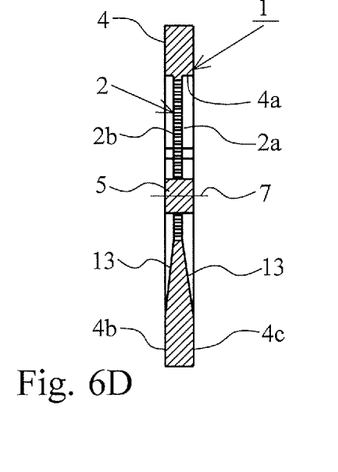
FIG. 6D is a cross-sectional view of the mesh filter illustrated taken along a line A6-A6 of FIG. 6A.

FIGS. 6A-6D include drawings illustrating the mesh filter 1 according to the fourth embodiment of the present invention, FIG. 6A is a plan view of the mesh filter 1, FIG. 6B is a side view of the mesh filter 1, FIG. 6C is a back view of the mesh filter 1, and FIG. 6D is a cross-sectional view of the mesh filter 1 illustrated taken along a line A6-A6 of FIG. 6A.

The mesh filter 1 according to the embodiment includes the pair of outer ribs 13, 13 at the mesh portion 2 in addition to the one outer rib 13 of the mesh filter 1 according to the third embodiment. Defining an imaginary straight line passing through the center of the gate detachment part 6 and bisecting the planar shape of the frame body 4 as the first imaginary straight line 11 and defining an imaginary straight line passing through the geometric center P (the center of the thick portion 5) of the frame body 4 and perpendicular to the first imaginary straight line 11 as a second imaginary straight line 27, the pair of outer ribs 13, 13 are formed so as to be opposed at positions close to the gate detachment part 6 side with respect to the second imaginary straight line 27. The pair of outer ribs 13, 13 extend to the near side of the first imaginary straight line 11 along the second imaginary straight line 27 (parallel to the second imaginary straight line 27) from the inner peripheral surface 4a of the frame body 4. With the three outer ribs 13, the length of the outer rib 13 on the first imaginary straight line 11 positioned far from the gate detachment part 6 is formed longer than the lengths of the pair of outer ribs 13, 13 and the lengths of the pair of outer ribs 13, 13 are formed to have an identical length. The three outer ribs 13 are formed so as to gradually decrease in height from the front surface 2a (or the back surface 2b) of the mesh portion 2 as the outer ribs 13 are away from the inner peripheral surface 4a of the frame body 4. The mesh filter 1 with such configuration is formed into a linearly symmetrical shape with respect to the first imaginary straight line 11.

The mesh filter 1 according to the embodiment is effectively applicable to the mesh filter 1 having a size larger than that of the mesh filter 1 according to the third embodiment and having a size smaller than that of the mesh filter 1 according to the first embodiment (the total area of the openings 3 on the mesh portion 2 is configured to be larger than that of the openings 3 in the case where the configuration of the mesh filter 1 according to the first embodiment is applied), thus ensuring obtaining the effects similar to those of the mesh filter 1 according to the first embodiment. Identical reference numerals are used for components of the mesh filter 1 according to the embodiment corresponding to the components of the mesh filter 1 according to the first embodiment, and the following omits descriptions overlapped with those of the mesh filter 1 according to the first embodiment.

FIFTH EMBODIMENT

Figures 7A, 7B, 7C, 7D:
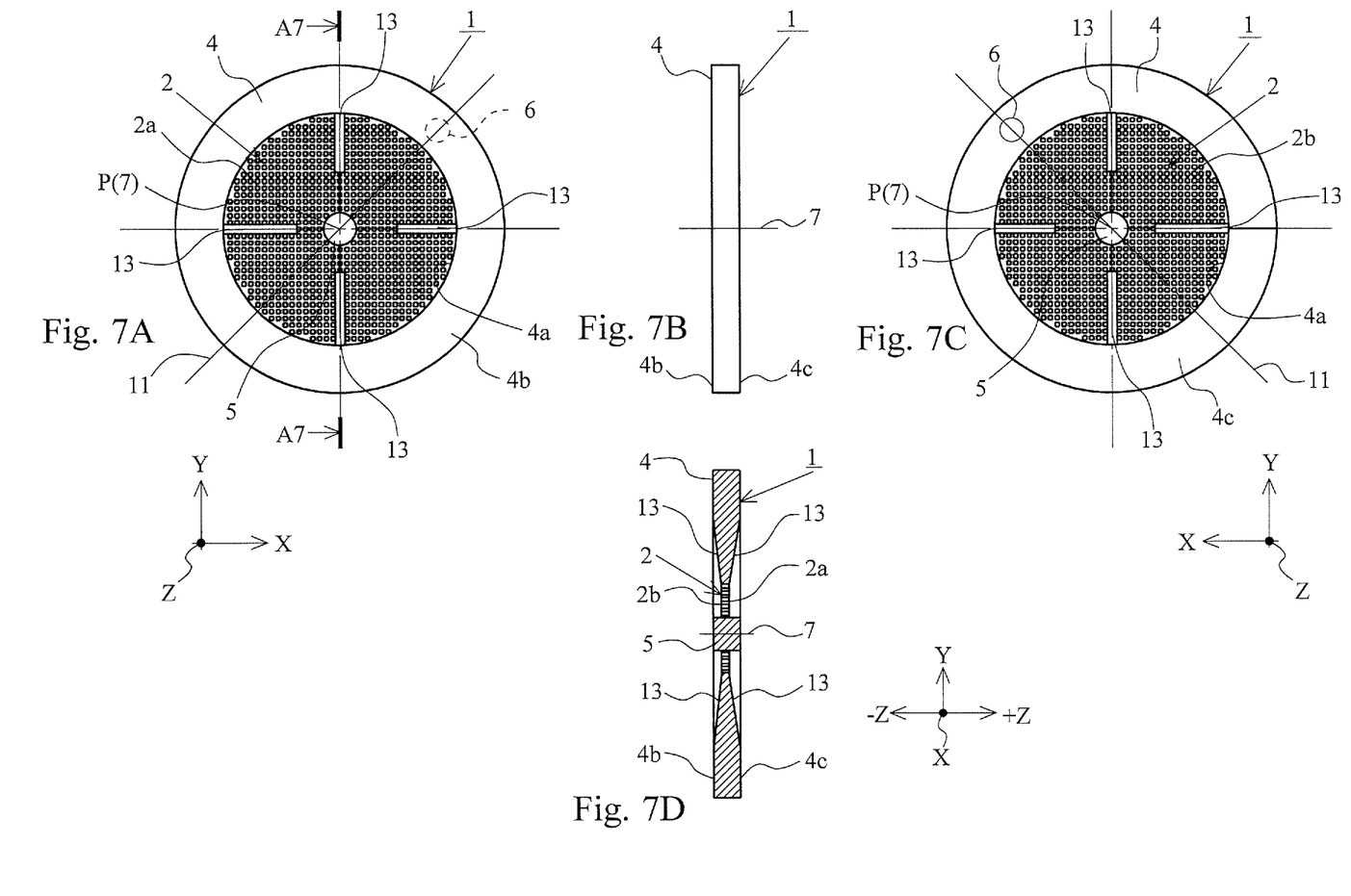
FIG. 7A is a plan view of the mesh filter.
FIG. 7B is a side view of the mesh filter.
FIG. 7C is a back view of the mesh filter.
FIG. 7D is a cross-sectional view of the mesh filter illustrated taken along a line A7-A7 of FIG. 7A.

FIGS. 7A-7D include drawings illustrating the mesh filter 1 according to the fifth embodiment of the present invention, FIG. 7A is a plan view of the mesh filter 1, FIG. 7B is a side view of the mesh filter 1, FIG. 7C is a back view of the mesh filter 1, and FIG. 7D is a cross-sectional view of the mesh filter 1 illustrated taken along a line A7-A7 of FIG. 7A.

The mesh filter 1 according to the embodiment includes the four outer ribs 13 at regular intervals at each of both front and back surfaces 2a, 2b of the mesh portion 2. These four outer ribs 13 are formed to be positioned displaced by 45° with respect to the imaginary straight line 11, which passes through the center of the gate detachment part 6 and bisects the planar shape of the frame body. Among the four outer ribs 13, the pair of outer ribs 13, 13 positioned far from the gate detachment part 6 are formed longer than the pair of outer ribs 13, 13 positioned close to the gate detachment part 6. The four outer ribs 13 are formed so as to gradually decrease in height from the front surface 2a (or the back surface 2b) of the mesh portion 2 as the outer ribs 13 are away from the inner peripheral surface 4a of the frame body 4. The mesh filter 1 with such configuration is formed into a linearly symmetrical shape with respect to the imaginary straight line 11.

The mesh filter 1 according to the embodiment is effectively applicable to the mesh filter 1 having a size larger than that of the mesh filter 1 according to the fourth embodiment and having a size smaller than that of the mesh filter 1 according to the first embodiment (the total area of the openings 3 on the mesh portion 1 is configured to be larger than that of the openings 3 in the case where the configuration of the mesh filter 1 according to the first embodiment is applied), thus ensuring obtaining the effects similar to those of the mesh filter 1 according to the first embodiment. Identical reference numerals are used for components of the mesh filter 1 according to the embodiment corresponding to the components of the mesh filter 1 according to the first embodiment, and the following omits descriptions overlapped with those of the mesh filter 1 according to the first embodiment.

Other Embodiments

With the above-described respective embodiments of the present invention, the center of the thick portion 5 is formed so as to match the center axis 7 (the geometric center P of the frame body 4) of the mesh filter 1; however, the configuration is not limited to this. As long as the thick portion 5 becomes the final filled portion of the molten resin at injection molding and is usable as the gas purge part, the center of the thick portion 5 may be formed to be positioned displaced from the center axis 7 of the mesh filter 1. The thick portion 5 has the circular button shape in plan view; however, the configuration is not limited to this and may have a polygonal shape (such as a quadrangular shape and a hexagonal shape) in plan view.

The mesh filters 1 according to the first, the fourth, and the fifth embodiments of the present invention may be formed such that cross-sectional areas of coupling portions of the outer ribs 13 with the frame body 4 become large as the coupling portions are positioned far from the gate detachment part 6.

With the mesh filters 1 according to the first and the second embodiments of the present invention, the inner ribs 12 and the outer ribs 13 are formed on both front and back surfaces 2a, 2b of a filter portion 2, however, the configuration is not limited to this. The inner ribs 12 and the outer ribs 13 may be formed on any one of (the front surface 2a or the back surface 2b) both front and back surfaces 2a, 2b of the filter portion 2. With the mesh filters 1 according to the third to the fifth embodiments of the present invention, the outer ribs 13 are formed on both front and back surfaces 2a, 2b of the filter portion 2; however, the configuration is not limited to this. The outer rib 13 may be formed on any one of (the front surface 2a or the back surface 2b) both front and back surfaces 2a, 2b of the filter portion 2.

With the mesh filter 1 according to the first and the second embodiments of the present invention, the heights of the inner ribs 12 from the mesh portion 2 gradually decrease from the thick portion 5 toward the frame body 4 side, and the heights of the outer ribs 13 from the mesh portion 2 gradually decrease from the outer peripheral side of the mesh portion 2 toward the inner peripheral side of the mesh portion 2. However, the configuration is not limited to this. The inner ribs 12 may be formed to have the identical heights and the outer ribs 13 may be formed to have the identical heights. With the mesh filters 1 according to the third to the fifth embodiments of the present invention, the heights of the outer ribs 13 from the mesh portion 2 gradually decrease from the outer peripheral side of the mesh portion 2 to the inner peripheral side of the mesh portion 2. However, the configuration is not limited to this, and the outer ribs 13 may be formed to have the identical heights.

With the mesh filters 1 according to the above-described respective embodiments of the present invention, the frame body 4 has the circular ring shape in plan view and the mesh portion 2 has the circular plate shape in plan view; however, the configuration is not limited to this. The frame body 4 may have a ring-shaped polygonal shape (such as a quadrangular shape and a hexagonal shape) in plan view and the mesh portion 2 may have a shape matching the shape of the inner peripheral surface of the frame body 4 in plan view. The frame body 4 may change the shape to a shape according to a mounting specification to a flow passage for fluid or similar specification.

The mesh filters 1 according to the respective embodiments of the present invention may be installed, for example, in the middle of a fuel supply pipe coupled to a fuel injection device of an automobile and in the middle of an oil pipe line such as a lubricating device of the automobile. Further, the applications are not limited to these and the mesh filters 1 are usable in a wide range of technical fields by being installed at a pipe line of a water supply pipe and a blast pipe to remove a foreign matter mixed with a fluid (liquid such as water and gas such as air).

DESCRIPTION OF REFERENCE SIGNS

1: Mesh filter
2: Mesh portion
3: Opening
4: Frame body
5: Thick portion
6: Gate detachment part
11: Imaginary straight line
13: Outer rib

The invention claimed is:

1. A mesh filter in which a mesh portion, a ring-shaped frame body, and a thick portion are integrally injection-molded, the mesh portion having a plurality of openings through which a fluid is passable, the ring-shaped frame body supporting an outer peripheral side of the mesh portion, the thick portion being positioned on an inner peripheral side of the mesh portion, wherein
the frame body includes a gate detachment part for injection molding at one place in a circumferential direction,
the mesh portion is integrally formed with an outer rib, the outer rib extending from the outer peripheral side to the inner peripheral side at a position away from the gate detachment part, the outer rib being symmetrical with respect to an imaginary straight line, the imaginary straight line passing through a center of the gate detachment part and bisecting a planar shape of the frame body,
the thick portion is formed so as to be positioned at a final filled portion of a molten resin flowing from the frame body toward the inner peripheral side of the mesh portion at injection molding, and
the outer rib reinforces the mesh portion, the outer rib accelerating the flow of the molten resin at the injection molding at the position away from the gate detachment part.

2. The mesh filter according to claim 1, wherein
the mesh portion has a circular plate shape in plan view, and
the frame body has a circular ring shape in plan view.

3. The mesh filter according to claim 1, wherein
the one outer rib is formed on the imaginary straight line, the imaginary straight line being rotated by 180° from the gate detachment part with respect to a geometric center of the frame body.

4. The mesh filter according to claim 1, wherein
a plurality of the outer ribs are formed to be symmetrical with respect to the imaginary straight line, and
the outer ribs are formed such that the outer ribs positioned far from the gate detachment part become longer than the outer ribs positioned close to the gate detachment part.

5. The mesh filter according to claim 4, wherein
the mesh portion includes four inner ribs at regular intervals in a peripheral area of a center axis of the thick portion, the four inner ribs extending from the thick portion toward the frame body side,
the inner ribs are formed displaced from the imaginary straight line, the inner ribs being formed to be symmetrical with respect to the imaginary straight line, and
the outer ribs are separately formed by a pair on both sides of extended lines of the inner ribs, the outer ribs being formed parallel to the inner ribs.

6. The mesh filter according to claim 5, wherein
the outer ribs and the inner ribs are formed on both front and back surfaces of the mesh portion.

7. The mesh filter according to claim 5, wherein
the outer ribs and the inner ribs are formed on any one of front and back surfaces of the mesh portion.

8. The mesh filter according to claim 5, wherein
the outer ribs have heights from the mesh portion formed so as to gradually decrease from an outer peripheral side of the mesh portion toward an inner peripheral side of the mesh portion, and
the inner ribs have heights from the mesh portion formed so as to gradually decrease from the thick portion toward the frame body side.

9. The mesh filter according to claim 4, wherein
the outer ribs are coupled to an inner peripheral surface of the frame body, the outer ribs being formed such that cross-sectional areas of coupling portions with the frame body become large as the coupling portions are far from the gate detachment part.

10. The mesh filter according to claim 1, wherein
the outer ribs are formed on both front and back surfaces of the mesh portion.

11. The mesh filter according to claim 1, wherein
the outer rib is formed on any one of front and back surfaces of the mesh portion.

12. The mesh filter according to claim 1, wherein
the outer rib has a height from the mesh portion formed so as to gradually decrease from an outer peripheral side of the mesh portion toward an inner peripheral side of the mesh portion.

13. The mesh filter according to claim 1, wherein
the outer rib is coupled to an inner peripheral surface of the frame body.

14. The mesh filter according to claim 1, wherein
the outer rib is formed to be positioned away from an inner peripheral surface of the frame body.

15. The mesh filter according to claim 1, wherein
the thick portion is formed to be positioned at a geometric center of the frame body.

* * * * *